United States Patent [19]

Klucz et al.

[11] Patent Number: 4,864,709

[45] Date of Patent: Sep. 12, 1989

[54] TOOLS FOR PULLING PROPELLERS AND BEARING CARRIERS FROM OUTBOARD UNITS

[76] Inventors: Francis M. Klucz, c/o Bay Marine, 2394 N. Cobb Pkwy., Kennesaw, Ga. 30144; Normand A. Brunet, 108 Aleta Dr., Belleair Beach, P.O. Box 149, Clearwater, Fla. 34625

[21] Appl. No.: 93,730

[22] Filed: Sep. 8, 1987

Related U.S. Application Data

[63] Continuation-in-part of Ser. No. 843,639, Mar. 25, 1986, abandoned.

[51] Int. Cl.[4] .................... B23P 19/04

[52] U.S. Cl. .................... 29/259; 29/258

[58] Field of Search .................... 29/256, 258–263

[56] References Cited

U.S. PATENT DOCUMENTS

| | | | |
|---|---|---|---|
| 1,324,704 | 12/1919 | Vose | 29/259 |
| 1,426,835 | 8/1922 | Mohrman | 29/259 |
| 3,277,563 | 10/1966 | Wilson | 29/259 |
| 3,689,978 | 9/1972 | Kelso | 29/259 |
| 4,492,014 | 1/1985 | Alexander | 29/259 |

*Primary Examiner*—Judy Hartman

*Attorney, Agent, or Firm*—Ronald E. Smith

[57] ABSTRACT

Tools having utility in the repair of outboard units. A first tool pulls a propeller off its shaft, and a second tool pulls a bearing carrier off the shaft and removes it from the inside of the outboard unit. Both tools include an elongate screw that axially advances to affect the desired pulling and both tools engage radially disposed struts of the item to be pulled when operatively deployed. The housing of each tool includes puller members terminating in strut-engaging mating surfaces at the distal free end thereof that abuttingly engage the struts from behind and exert a pulling force against them as the screw is rotated.

4 Claims, 2 Drawing Sheets

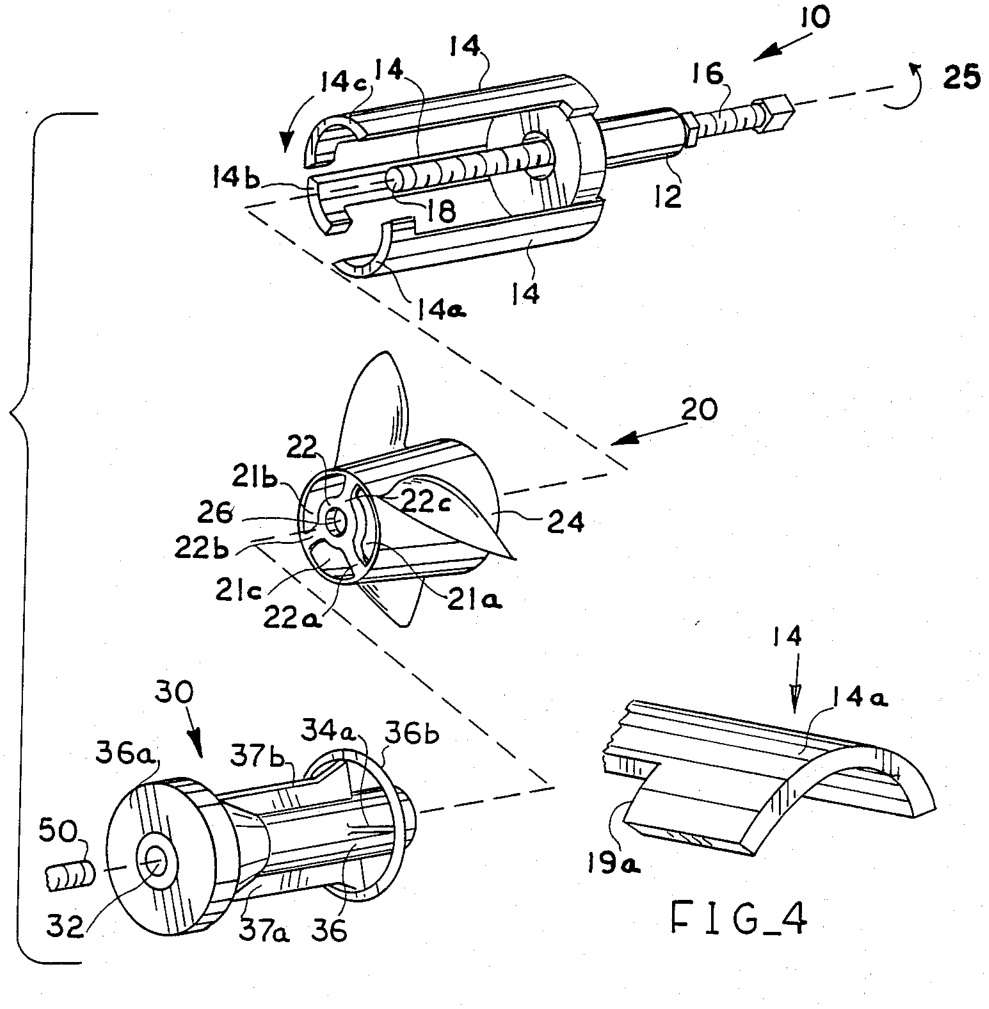
FIG_1
FIG_4
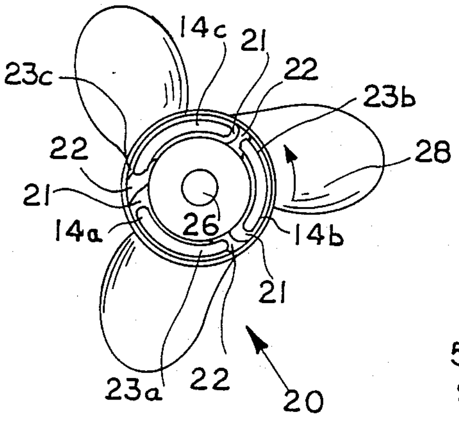
FIG_2
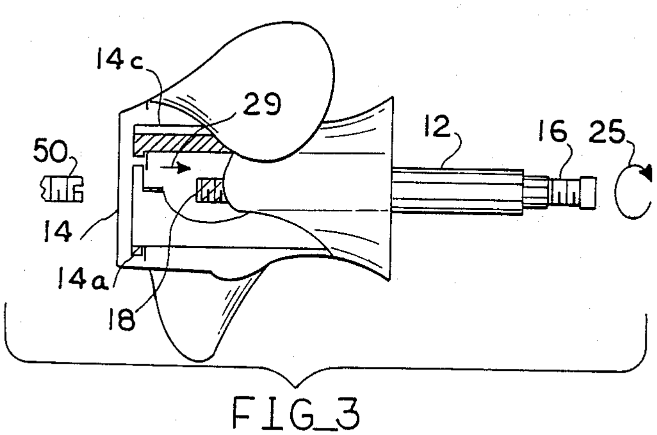
FIG_3

TOOLS FOR PULLING PROPELLERS AND BEARING CARRIERS FROM OUTBOARD UNITS

CROSS-REFERENCE TO RELATED APPLICATIONS

This is a continuing disclosure of an earlier disclosure filed Mar. 25, 1986, Ser. No. 843,639, by the same inventors, now abandoned.

BACKGROUND OF THE INVENTION

1. Field of the Invention

This invention relates, generally, to pulling tools and more particularly relates to tools for removing propellers and bearing carriers, of the type found in outboard units, for maintenance and repair purposes.

2. Description of the Prior Art

Pulling tools are in widespread use among auto mechanics.

U.S. Pat. No. 2,133,697 to Hansen (1938) shows a valve puller of the type used by auto mechanics. In FIG. 2 of the Hansen disclosure, it will there be seen that slot 6 is provided to receive the valve and to engage it as shown in FIG. 1. Hansen also shows an elongated threaded rod 8, nut 10 and cylinder 1.

Kellerman, in U.S. Pat. No. 3,008,226 (1961), discloses a device for removing universal joint bearings.

U.S. Pat. No. 3,299,497 to Chmielewski (1967) shows a pulley puller. More particularly, it shows grooves 16 which receive lugs 11 and 12.

A 1974 U.S. patent to Michelson, (No. 3,824,672), discloses a tool that removes a ball from a stud upon which it is press fit.

Finally, U.S. Pat. No. 4,236,291 to Barrow (1980) shows a tool for removing bearing carriers. Its primary feature is its bell-shaped pulling block 22.

None of these patents teach or suggest means for pulling propellers and bearing carriers from outboard units.

It is the primary object of this invention is to provide a tool that can remove propellers and bearing carriers in a relatively easy manner.

Another object of this invention is to provide a simple and rugged means to effect the desired pulling.

SUMMARY OF THE INVENTION

The invention accomplishes these and other objects by providing two structurally distinct yet functionally similar tools; each of the tools includes a screw-containing elongate housing having longitudinally extending puller members with enlarged, circumferentially extending mating surfaces formed at the distal free end thereof that abuttingly engage from behind certain radially disposed struts formed on the part to be pulled.

The novel tools provide several significant features and advantages. The tool employed to pull propellers grips it inside the propeller exhaust hub by abuttingly engaging the hub struts, as distinguished from the propeller blades or other structural parts that can be damaged responsive to application of force, thus avoiding damage to the propeller by using the strongest structural part of the propeller in the pulling process.

The use of the propeller-pulling tool eliminates the prior art usage of a torch to burn off rubber hubs, thereby saving the expense associated with the consumption of oxygen and acetylene. The tool is set up very fast by simply inserting it into clearance areas in the hub body and rotating it about its longitudinal axis of symmetry until its strut-engaging portions are positioned rearwardly of the struts to be engaged during the pulling process. This quick set up saves shop time and customer's money; indeed, most of the labor is completed in less than a quarter (¼) of the usual time. In addition, since the tool is of heavy construction it will not break or bend and will endure years of heavy shop use. Moreover, it has no chains or bolts to loosen or break.

The removal of a bearing carrier can be one of the most troublesome jobs in servicing outboard units. The tool employed to pull off a bearing carrier according to this invention allows fast and efficient repair jobs while minimizing the chance of damage. One important feature of the bearing puller tool is its heavy construction having no hooks, bolts or chains to loosen or break, which construction makes this tool very resistant to abuse. There are other advantages of this tool as well; it has a much faster setup than any other tool designed for this purpose. It also pulls the carrier straight out with no catching or binding. More pulling power can be applied than with any other tool designed for this purpose because of the unique manner in which it grips the carrier. Also, the reduced use of heat while using this tool will save oxygen and acetylene.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is an exploded perspective view of an illustrative embodiment of the invention showing the operative alignment of the tool for pulling a propeller, the propeller, the bearing carrier and the propeller shaft;

FIG. 2 is a front view of the propeller showing the engagement of the pulling tool mating surfaces with the radially disposed struts of the propeller;

FIG. 3 is a side view of the propeller having a portion thereof broken away to show part of the coupled pulling tool according to the invention;

FIG. 4 is a perspective view showing structural details of one of the strut-engaging mating surfaces of the propeller pulling tool according to the invention;

Similar reference numerals refer to similar parts throughout the several views of the drawings.

DETAILED DESCRIPTION OF THE PREFERRED EMBODIMENT

Figure 5:
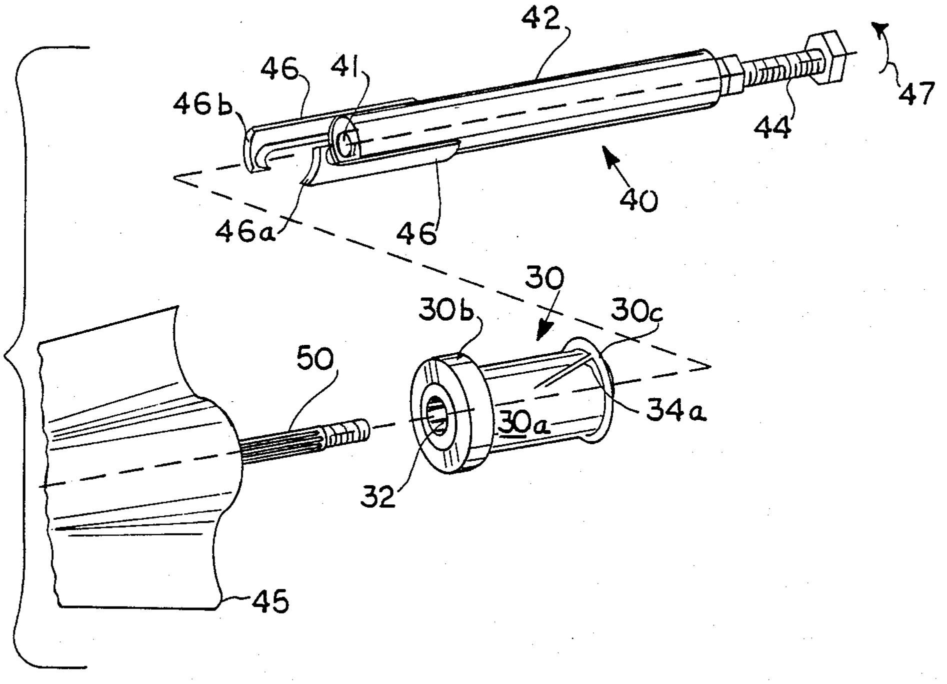
FIG. 5 is an exploded perspective view showing the operative alignment of the bearing carrier pulling tool, the bearing carrier and the shaft inside the outboard unit.

Referring now to FIG. 1, it will there be seen that the propeller puller, designated as a whole by the reference numeral 10, includes a cylindrical housing 12 integrally formed with three circumferentially spaced, longitudinally extending puller members, collectively designated 14, having strut-engaging mating surfaces **14*a*, 14*b* and 14*c* formed at their respective distal free ends. Cylindrical housing or boss member 12 includes an elongate cylindrical section as shown which is integral with an enlarged, disc-shaped base member 13 to which the puller members 14 are fixedly secured, radially outwardly thereof, as shown. As is depicted in FIG. 1, each puller member 14 is of arcuate configuration when seen in end view, as is each mating surface 14*a*, 14*b* and 14*c***.

The portions **14*a*, 14*b* and 14*c* are enlarged relative to their associated puller members, extending circumferentially therebeyond as depicted in FIGS. 1 and 4**.

Housing 12 is internally threaded and is screw threadedly engaged by externally threaded elongate screw 16 as shown. Distal end 18 of screw 16 is positioned against shaft 50 of the outboard unit when the tool is in use; end 18 is formed so that shaft 50 centers upon it.

Propeller 20, when in use, abuts the end of carrier 30 as indicated by the broken line appearing in the lower portion of FIG. 1. The end of shaft 50 is inserted into opening 26 formed in propeller 20.

Propeller 20 includes housing 24 having three (unnumbered) blades extending radially outwardly therefrom. Circumferentially spaced radial strut members **22*a*, 22*b* and 22*c* extend between housing 24 and hub 22. The length of the strut members 22*a*, 22*b* and 22*c* determines the amount of clearance between hub 22 and housing 24; the respective clearances are indicated by the reference numerals 21*a*, 21*b* and 21*c***.

Bearing carrier 30 has a hollow cylindrical housing 36 that is integrally formed with and positioned intermediate of flange **36*a* and annular ring 36*b*. Two diametrically opposed web members 37*a* and 37*b* extend between flange 36*a* and ring 36*b*; two diametrically opposed triangular-shaped strut members 34*a* and 34*b* (34*b* not shown) are formed on housing 36 and join it to ring 36*b*. Strut members 34*a* and 34*b* are abuttingly engaged by the complementally formed distal free ends 46*a* and 46*b* of bearing carrier puller 40**, hereinafter described, when the invention is in use.

FIG. 2 depicts mating surfaces **14*a*, 14*b* and 14*c* of puller members 14 when the same are inserted through clearances 21*a*, 21*b* and 21*c*, respectively. Angular rotation of housing 12 in the direction of arrow 28 positions mating surfaces 14*a*, 14*b* and 14*c* behind strut members 22*a*, 22*b* and 22*c* until they abuttingly engage the respective strut members as indicated by the reference numerals 23*a*, 23*b* and 23*c*. It should be understood that the position shown in FIG. 2 is not the final operative position; continued angular rotation moves mating surfaces 14*a*, 14*b* and 14*c* completely behind strut members 22*a*, 22*b* and 22*c***, respectively.

It should be noted that strut members **22*a*, 22*b* and 22*c*** are the strongest structural feature of the propeller assembly; accordingly, the teaching of this invention that such struts are the most adviseable portion of the propeller to engage when pulling the propeller from the shaft is one of the more important teachings of this invention. Prior art tools engage weaker portions of the propeller assembly.

FIG. 3 illustrates puller 10 coupled with propeller 20 in a position ready for the pulling action. Elongate screw 16 is rotated clockwise (as indicated by directional arrow 25) which rotation axially advances it and which advance positions the screw's distal end 18 against shaft 50. Continuing rotation of screw 16 effects retraction of housing 12 relative to shaft 50, thereby generating a pulling force between mating surfaces **14*a*, 14*b* and 14*c* against struts 22*a*, 22*b* and 22*c*, respectively, in the direction of arrow 29. This force pulls propeller 20 off shaft 50 since shaft 50** cannot move.

FIG. 4 shows the enlarged end portion of mating surface **14*a*; surface 19*a* engages strut 22*a* at the location 23*a*. Since struts 22*a*, 22*b* and 22*c* are flat on their respective rearward surfaces, mating surfaces 19*a*, 19*b* and 19*c*** are also flat.

Referring now to FIG. 5, it will there be seen that a puller 40 that is employed to remove bearing carrier 30 includes a housing 42 integrally formed with two diametrically opposed, longitudinally extending puller members, collectively designated 46, having enlarged strut-engaging mating surfaces **46*a* and 46*b*** formed in their respective distal free ends which strut-engaging portions extend circumferentially to define a means whereby the struts of the bearing carrier may be engaged when said circumferentially extending portions are positioned rearwardly thereof.

Housing 42 is internally threaded and receives externally threaded elongate screw 44 therein. During the pulling operation hereinafter described, end face 41 of screw 44 centers against shaft 50 of outboard unit 45. Carrier 30 is normally positioned inside outboard unit 45 and shaft 50 is inserted into opening 32 of carrier 30.

Figure 7:
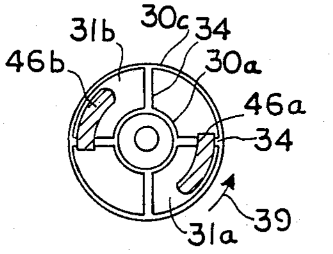
FIG. 7 is a view of the bearing carrier taken along line 7—7 in FIG. 6, showing the engagement of the pulling tool mating surfaces with the struts of the bearing carrier.

Bearing carrier 30 includes body portion **30*a* which is integrally formed with and positioned intermediate flange 30*b* and ring member 30*c*. Struts 34 extend between body portion 30*a* and ring member 30*c* as shown in FIG. 7; these struts 34 are structurally the strongest portion of the bearing carrier. The respective lengths of the struts 34 determines the amount of clearance 31*a* and 31*b* existing between main body 30*a* and ring member 30*c* as is clear from an inspection of FIG. 7**.

FIG. 7 also shows strut-engaging mating surfaces **46*a* and 46*b* of puller members 46 inserted through clearances 31*a* and 31*b*, respectively. By applying an angular rotation to housing 40 in the direction of arrow 39, the mating surfaces 46*a*, 46*b* rotate behind and abuttingly engage struts 34 as depicted. This is the proper position for the tool to enable its pulling action to remove carrier 30**.

Figure 6:
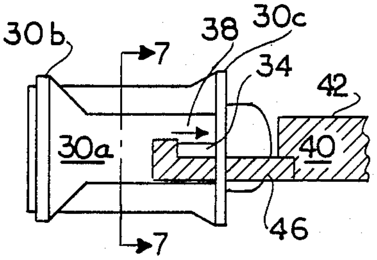
FIG. 6 is a side view of the bearing carrier coupled with the pulling tool according to the invention.

FIG. 6 illustrates puller 40 coupled with carrier 30 in a position ready for the pulling action. Elongate screw 44 is rotated clockwise (see arrow 47 in FIG. 5) so that it axially advances; its end face 41 is specifically configured so that it centers against shaft 50. Rotation of screw 44 effects retraction of housing 40; such retraction creates a pulling force of mating surfaces **46*a* and 46*b* against their respective, associated struts 34 in the direction of arrow 38 (FIG. 6). This force pulls carrier 30 off the shaft 50** and out of the outboard unit.

The propeller is removed before the bearing carrier; accordingly, tool 10 is used before tool 40.

Figure 8:
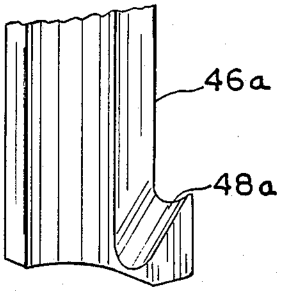
FIG. 8 is a perspective view of one of the strut-engaging mating surfaces of the bearing carrier pulling tool according to the invention.

FIG. 8 shows a portion of mating surface **46*a*. Surface 48*a* is positioned at an angle that matches the angle of its associated strut 34*a*, shown in FIG. 5. In this manner, as in the case of tool 10**, the structurally strongest portion of the bearing carrier is abuttingly gripped from behind by a surface that matches it; this allows all of the pulling force to be efficiently transferred to the item being pulled.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Now that the invention has been described,

What is claimed is:

1. A tool for pulling a propeller off the output shaft of an outboard motor, said tool having utility in connection with propeller members of the type having a central hub, a plurality of three circumferentially and equidistantly spaced, radially disposed strut members extending from said hub, a housing positioned in surrounding, concentric relation to said hub, said strut members rigidly interconnecting said hub and said housing, a plurality of three clearance spaces having their respective radially inward boundaries defined by said hub, their respective radially outward boundaries defined by said housing, and their respective circumferential boundaries defined by said strut members, wherein the improvement comprises:

an elongate screw member having a distal end adapted to bear against a forward end of said output shaft;

an elongate boss member adapted to screw-threadedly receive said screw member;

an enlarged disc-shaped base member integral with a distal end of said boss member;

a plurality of three circumferentially and equidistantly spaced elongate puller members mounted about the periphery of said base member and extending therefrom in parallel relation to said boss member;

said puller members being integral to said base member;

each of said puller members terminating in an offset portion that extends circumferentially from the respective distal ends thereof;

each of said puller members and offset portions being arcuate in configuration when seen in end view;

each of said offset portions adapted to abuttingly engage a rearward surface of an associated strut member;

each of said puller members and offset portions being specifically dimensioned to slideably fit through an associated clearance space to accomplish internal pulling of said propeller when said boss member is rotated to position said offset portions rearwardly of associated strut members;

whereby to remove said propeller from said output shaft, the puller members are inserted through their associated clearance spaces, the screw member is centered with respect to said output shaft, the boss member and hence the puller members are rotated so that the offset portions of said puller members are positioned rearwardly of their respective strut members, and said screw member is axially advanced;

whereby due to the fixed position of said output shaft, said boss member and hence said puller members and hence said strut members are constrained to advanced forwardly attendant said axial advancement of said screw member.

2. The tool of claim 1, wherein said strut members have a flat rearward surface and wherein the respective surfaces of said puller member offset portions that abuttingly engage their associated flat rearward surfaces are complementally formed with respect thereto.

3. A tool for pulling a bearing carrier off the output shaft of an outboard motor, said bearing carrier of the type positioned within a housing such that its rearward end is substantially inaccessible to a person positioned forwardly of said bearing carrier, said bearing carrier having a cylindrical body, a ring member positioned at the forward end of said body, radially outwardly thereof, said ring member rigidly interconnected to said body by a plurality of four radially disposed, equidistantly and circumferentially spaced strut members, a plurality of four clearance spaces defined at their respective radially inward boundaries by said body, at their radially outward boundaries by said ring member, at their circumferential boundaries by said strut members, a pair of diametrically opposed web members extending between said body and said ring member coincident with a preselected diametrically opposed pair of said strut members, wherein the improvement comprises:

an elongate screw member having a distal end adapted to bear against said output shaft;

an elongate boss member adapted to screw-threadedly receive said screw member;

a pair of diametrically opposed elongate puller members mounted about the periphery of said boss member and extending therefrom in parallel relation thereto;

said puller members being integral with said boss member;

both of said puller members terminating in an offset portion that extends circumferentially from the respective distal ends thereof;

said puller members and said offset portions having an arcuate configuration when seen in end view;

both of said offset portions having an angled mating surface and being adapted to abuttingly engage a rearward surface of an associated web member;

said puller members and said offset portions being dimensioned to slideably fit within associated clearance spaces to accomplish internal pulling of said bearing carrier when said boss member is rotated to position said offset portions rearwardly of associated web members;

whereby to remove said bearing carrier from said output shaft, the puller members are inserted into their associated clearance spaces, the screw member is centered with respect to said output shaft, the boss member and hence the puller members are rotated so that the offset portions of the puller members are positioned rearwardly of their respective web members, and said screw member is axially advanced;

whereby due to the fixed position of said output shaft, said boss member and hence said puller members and hence said web members are constrained to advance forwardly attendant said axial advancement of said screw member.

4. The tool of claim 3, wherein said web members have an angled rearward surface and wherein the respective surfaces of said puller member offset portions that abuttingly engage their associated angled web rearward surfaces are complementally formed with respect thereto.

* * * * *